March 29, 1927.
H. V. CARPENTER
1,622,763
DEVICE USED FOR CONTROLLING THE SPEED OF WATER WHEELS
Filed Jan. 9, 1922
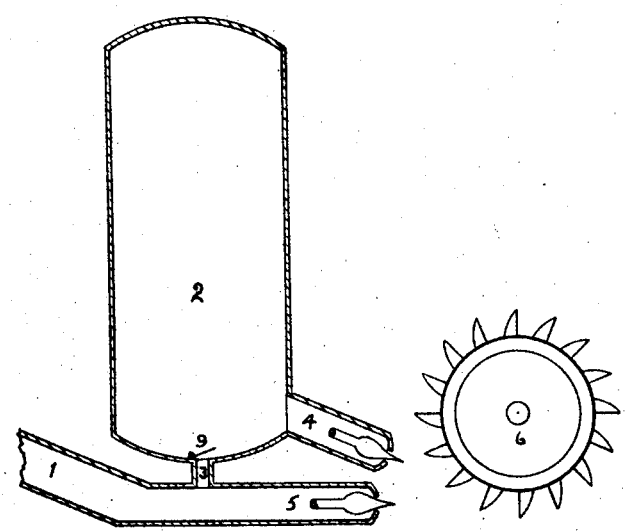
Inventor.
Hubert Vinton Carpenter Patented Mar. 29, 1927.

1,622,763

UNITED STATES PATENT OFFICE.

HUBERT VINTON CARPENTER, OF PULLMAN, WASHINGTON.

DEVICE USED FOR CONTROLLING THE SPEED OF WATER WHEELS.

Application filed January 9, 1922. Serial No. 528,092.

This specification covers an invention first disclosed in application filed Sept. 19, 1919, Serial No. 324,999, which was abandoned.

The object of this invention is to give a better means of maintaining the speed of a water wheel during the few seconds after a sudden increase in load when the inertia of the water in the penstock prevents the delivery of the needed amount of water to carry the new load. I do this in the following way, the details of the description being based on the use of a water wheel of the impulse type.

I install a storage tank, surge tank or standpipe near the water wheel, just as is frequently done, except that I add a special nozzle which is supplied direct from the storage tank and acts directly on the wheel. I also supply water to the storage tank in any way except that it must be so arranged that any flow of water from the storage tank to the penstock is restricted or entirely prevented.

The single figure which is a vertical section of the entire water wheel unit, shows the combination of parts making up this invention as applied to an impulse wheel. The wheel 6 is equipped with needle nozzles, 4 and 5, and a tank, 2, arranged to store water. It is to be understood that in low head plants an open standpipe would be substituted for the closed tank shown. The tank is supplied through the connecting pipe, 3, from the penstock, 1, and the pipe, 3, contains a check valve, 9, to check the flow of water from the tank to the penstock. The nozzles, 4 and 5, shown, are of the ordinary needle type in which the flow of water through them is decreased by advancing the needle and increased by withdrawing the needle from the opening of the nozzle. A suitable mechanism for operating the needle valves as herein required is disclosed in application, Serial #26,253, filed April 27th, 1925.

In operation, a steady load is carried largely by or wholly by nozzle 5, supplied directly through the penstock. Whenever the load suddenly increases a governor not shown opens nozzle 4, and at the same time or very soon after opens nozzle 5. Nozzle 4 carries the load with water from the tank while the opening of nozzle 5 lowers the pressure in the penstock and permits the flow to speed up in the penstock, thus as rapidly as possible getting a rate of flow through nozzle 5 sufficient to carry the new load. The mechanism controlling nozzle 4 is to be adjusted so that it will gradually close as nozzle 5 becomes able to handle the increased load.

This arrangement avoids the following defects found in the usual methods of using a storage tank or standpipe: First, the stored water in all arrangements heretofore used enters the wheel by way of the penstock and the main nozzle or gates, and in order for it to do this the pressure in the penstock must be lowered, thus making it necessary for the stored water to be used at a reduced pressure and efficiency; second, the flow of water from the storage tank into the penstock prevents the pressure there from dropping as much as it otherwise would and so decreases the rate of acceleration of the water in the penstock. Rapid acceleration is needed in order that the supply of stored water need not be drawn on for any longer period than is necessary.

It will be understood that the unit may be equipped with relief valves, waste nozzles or other devices to prevent excess pressures. Since these are not a part of this invention they are not shown but it is to be understood that the use of some such device will usually be desirable. It is also to be understood, however, that the passage way, 3, from the penstock to the storage tank may be made free enough so that the tank will be of material assistance in absorbing the energy of the water in the penstock which must be absorbed or dissipated whenever the flow in the penstock is suddenly checked by the sudden closing of valve 5. The check valve, 9, need not entirely close the passage, 3, against flow from the tank to the penstock. Entire closure will prevent waste of water and partial closure will cause less shock so the design should vary with conditions.

It will be further understood that I do not limit myself to the use of any particular type of governor. The governor must be strong in order to accomplish its added duties in handling the special nozzle used to deliver the stored water to the wheel. Otherwise the governor may be any of the types now in use and it may be associated with nozzle 5 in any of the ordinary ways.

I wish to make it clear also that the special nozzle, 4, may or may not be operated in the closed position during steady load periods. It will assist in maintaining freedom of motion of the parts to normally operate with a certain amount of water being used through the storage tank and the special nozzle, 4. This amount should be less than that which would cause serious loss due to water friction in the connection, 3, since all the water which is used in the special nozzle must flow through 3.

It is to be understood that this invention may be used with any type of nozzle used in impulse wheel units.

It is also to be understood that this invention may be used with any of the types of storage tanks or stand-pipes, for while it is described as if intended for high head plants it is to be understood that its effectiveness depends more upon the ratio of length of pipe line to head than upon the head alone. This is because the water in a pipe laid on a slight incline will accelerate slowly regardless of the length of the line.

It is also to be understood that the governing of units in which this invention is incorporated may be accomplished for the usual small changes of load, either by manipulation of the main nozzle or by use of the special nozzle, or by the simultaneous use of both. The storage tank has its usual effect in making regulation easier, independent of the special features secured by this invention, but can act more effectively for both increase and decrease of load if the regulating device acts upon the special nozzle, at least in part.

I claim:—

1. A combination, with a water wheel unit of the impulse type, of a storage tank which receives water from the penstock of the unit, a check valve which restricts any flow of water back from the storage tank to the penstock, and an additional nozzle which receives water from the storage tank and delivers it to the wheel; substantially as shown and described.

2. A water power unit, comprising an impulse wheel with a nozzle delivering water from a penstock to the wheel, combined with a storage tank supplied from the penstock, an additional nozzle which delivers water from the storage tank to the wheel, and a check valve which restricts the flow of water from the storage tank to the penstock; substantially as and for the purpose described.

3. A water power unit of the impulse type, combined with a storage tank which receives water from the penstock of the unit, and an auxiliary nozzle which receives water from the storage tank and delivers it to the wheel; substantially as shown and described.

HUBERT VINTON CARPENTER.